US006691555B2

(12) United States Patent
Ohkama et al.

(10) Patent No.: US 6,691,555 B2
(45) Date of Patent: Feb. 17, 2004

(54) FIRING STATE DISCRIMINATION SYSTEM FOR INTERNAL COMBUSTION ENGINES

(75) Inventors: Toshihiro Ohkama, Wako (JP); Gakuji Moriya, Wako (JP); Kenichi Ishida, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 35 days.

(21) Appl. No.: 10/180,094

(22) Filed: Jun. 27, 2002

(65) Prior Publication Data

US 2003/0006774 A1 Jan. 9, 2003

(30) Foreign Application Priority Data

Jul. 3, 2001 (JP) ....................................... 2001-202591

(51) Int. Cl.[7] ............................................. G01M 15/00
(52) U.S. Cl. ..................................................... 73/35.08
(58) Field of Search ............................ 73/35.01, 35.07, 73/35.08, 116, 117.2, 117.3, 118.1; 324/378, 380, 391

(56) References Cited

U.S. PATENT DOCUMENTS 5,563,332 A * 10/1996 Yasuda ...................... 73/35.08
5,747,670 A * 5/1998 Takahashi et al. ......... 73/35.08
5,751,147 A * 5/1998 Nakata et al. .............. 324/399
6,298,823 B1 * 10/2001 Takahashi et al. ..... 123/406.37
6,328,016 B1 * 12/2001 Takahashi et al. ..... 123/406.35
6,418,785 B1 * 7/2002 Hatazawa et al. ......... 73/35.08
2002/0069696 A1 * 6/2002 Hatazawa et al. ............ 73/116

FOREIGN PATENT DOCUMENTS

JP 5-99956 4/1993

* cited by examiner

*Primary Examiner*—Eric S. McCall
(74) *Attorney, Agent, or Firm*—Arent Fox Kintner Plotkin & Kahn, PLLC

(57) ABSTRACT

A firing or ignition state discrimination system for an internal combustion engines having a spark plug which produces spark discharge when supplied with discharge current from an ignition coil to ignite air-fuel mixture in the combustion chamber. In the system, ionic-current that flows during combustion of the air-fuel mixture is detected at a predetermined first timing and leakage current that flows across electrodes of the spark plug is detected at a predetermined second timing which is later than the predetermined first timing. The firing or ignition state of the engine is discriminated to one from among normal, misfiring, spark plug fouling, and failure in ignition system or in fuel supply system based on the detected ionic-current and leakage current and presence or absence of fuel cutoff to the engine. With this, it becomes possible to accurately discriminates the firing or ignition state of the spark plug and to inform the fact to the vehicle operator if desired.

15 Claims, 7 Drawing Sheets

FIG. 6

| INTEGRATOR OUTPUT (IONIC-CURRENT→LEAKAGE CURRENT) | FIRING STATE |
|---|---|
| Hi→Low | NORMAL |
| Low→Low | MISFIRING OR SYSTEM FAILURE |
| Hi→Hi | PLUG FOULING OR SYSTEM FAILURE |
| Hi→Low DURING FUEL CUTOFF | SYSTEM FAILURE |
| Low→Low DURING FUEL CUTOFF | NORMAL |

FIRING STATE DISCRIMINATION SYSTEM FOR INTERNAL COMBUSTION ENGINES

BACKGROUND OF THE INVENTION

1. Field of the Invention

This invention relates to a system for discriminating firing or ignition state for internal combustion engines that can discriminate firing or ignition state based on ionic-current occurring upon combustion of air-fuel mixture in the engine combustion chamber, particularly to such a firing state discrimination system for internal combustion engines that can accurately discriminate the firing state including occurrence of misfiring, fouling (smoldering) of a spark plug caused by deposits such as soot, carbon residues, etc. and a failure in the ignition system or in fuel supply system based on the ionic-current and leakage current.

2. Description of the Related Art

In a gasoline or other spark-ignition internal combustion engine, a high voltage generated by the ignition coil is applied through an ignition distributor or the like to spark plugs installed in the individual cylinders. The spark discharge that the high voltages produces across the gap between the spark plug electrodes ignites the air-fuel mixture, causing firing and combustion. However, when certain causes are present during the engine ignition/combustion stroke, the combustion of the air-fuel mixture does not proceed normally, i.e., misfiring occurs.

Causes of misfiring fall in two classes, those attributable to the fuel supply system and those attributable to the ignition system. Misfiring attributable to the fuel supply system is the result of either excessively lean or excessively rich air-fuel mixture. In this case, a spark discharge is produced across the gap of the spark plug but the air-fuel mixture does not ignite. Misfiring attributable to the ignition system is the result of spark plug fouling (smoldering) caused by deposits of soot, carbon residues, ash from fuel and oil additives, etc., or of a problem in the ignition circuit that prevents normal spark discharge (mis-sparking).

When the air-fuel mixture burns normally, the combustion is accompanied by ionization of the air-fuel mixture (more precisely the combustion gas produced by normal burning of the air-fuel mixture) that gives rise to ionic-current. When misfiring occurs and the air-fuel mixture does not burn, the air-fuel mixture does not ionize and no ionic-current arises.

FIG. 7 shows the ionic-current waveforms during misfiring and normal combustion, in which the discharge is produced by a high voltage of negative polarity. As shown, the ionic-current waveform during normal combustion, i.e., when ions are produced, spikes instantaneously in the minus direction just after the discharge across the spark plug electrodes (as seen at A in the drawing), thereafter continues to flow in proportion to the volume or number of ions produced, and eventually returns to a given level. During misfiring, i.e., when ions are not produced, the waveform spikes instantaneously in the minus direction just after the end of discharge (as seen at A' in the drawing) and then immediately returns to the given level.

A widely used method of detecting misfiring has therefore been to detect the ionic-current (current waveform) occurring during the combustion stroke using the spark plug, more exactly the electrodes thereof, as a probe for detecting ionic-current, and comparing the detected value with a prescribed value, as taught by, for example, Japanese Laid-open Patent Application No. Hei 5(1993)-99956.

It should be noted that in the figure, spikes marked by A, A', B and B' are sharp rises instantaneously caused by inductive noise due to the electromagnetic induction of spark plug.

The resistance between spark plug electrodes are almost infinity during normal condition. Accordingly, when misfiring occurs and no ions are produced, current does not flow across the electrodes. However, if the aforesaid spark plug fouling (smoldering) occurs, the resistance between electrodes drops to a level of several MΩ or thereabout, resulting in leakage current flow even during misfiring where no ions are produced. This leakage current may erroneously be detected as the ionic-current, which makes accurate misfiring detection impossible.

When a spark plug becomes fouled (smoldered), no spark charge can jump across its electrodes and misfiring occurs. When this happens, unburned fuel may disadvantageously damage a catalytic converter when post-ignited or may disadvantageously degrade emission. Therefore, it has been desired to accurately discriminate firing or ignition state including spark plug fouling (smoldering) and misfiring, etc., and to inform the result of discrimination to the vehicle operator.

Aside from the above, the supply of fuel is temporarily cut off at certain vehicle running conditions so as to improve fuel economy or some other reasons. When the supply of fuel is cut off, since the fuel injection amount is made zero or thereabout (i.e., the air/fuel ratio is made an excessive lean value), no combustion occurs and hence no ionic-current flows. This is a kind of misfiring state, but should be distinguished from ordinary misfiring which happens unintentionally to the vehicle operator. However, the prior art may disadvantageously detect this state as the ordinary misfiring.

SUMMARY OF THE INVENTION

A first object of the present invention is to overcome the aforesaid problems and to provide a firing state discrimination system for internal combustion engines which can discriminate the firing or ignition state of a spark plug including the occurrence of spark plug fouling (smoldering) and can distinguish the misfiring state due to fuel cutoff from ordinary misfiring.

A second object of the present invention is to provide a firing state discrimination system for internal combustion engines which can inform the result of discrimination to the vehicle operator so as to make it possible to prevent degradation of emission.

For achieving the first object, this invention provides a system for discriminating firing state for an internal combustion engine having a spark plug, installed in a combustion chamber of a cylinder of the engine and connected to an ignition coil, which produces spark discharge when supplied with discharge current from the ignition coil to ignite air-fuel mixture in the combustion chamber; comprising: ionic-current detecting means for detecting ionic-current that flows during combustion of the air-fuel mixture, at a predetermined first timing; leakage current detecting means for detecting leakage current that flows across electrodes of the spark plug, at a predetermined second timing which is later than the predetermined first timing; and firing state discriminating means for discriminating firing state of the engine based on outputs of the ionic-current detecting means and the leakage current detecting means.

For achieving the second object, this invention provides the system which further includes: informing means for informing the discriminated firing state to a vehicle operator.

BRIEF DESCRIPTION OF THE DRAWINGS

These and other objects and advantages of the invention will be made more apparent with reference to the following description and drawings, in which:

FIG. 6 is a table showing the result of discrimination obtained by the algorithm illustrated in the flow chart of FIG. 5.

DETAILED DESCRIPTION OF THE PREFERRED EMBODIMENT

A firing state discrimination system for internal combustion engines according to an embodiment of the present invention will now be explained with reference to the attached drawings.

Figure 1:
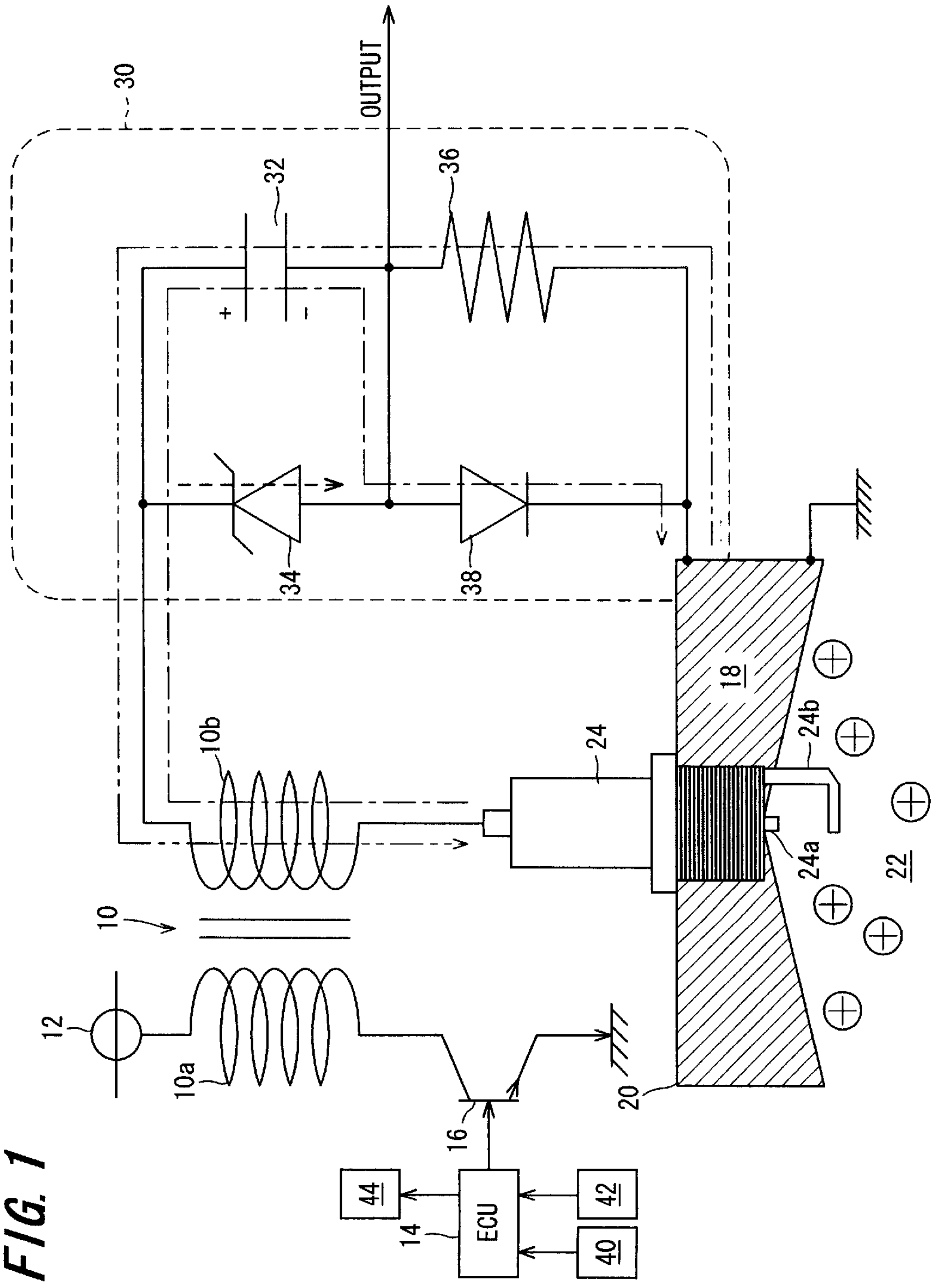
FIG. 1 is an explanatory circuit diagram showing an ignition circuit for producing a spark in a spark plug and an ionic-current detector for detecting ionic-current produced during combustion of a firing state discrimination system for internal combustion engines according to an embodiment of the present invention.

FIG. 1 is a partial circuit diagram of the firing state discrimination system according to the embodiment, showing an ignition circuit for producing a spark in a spark plug and an ionic-current detector for detecting ionic-current produced during combustion (and leakage current due to spark plug fouling).

As illustrated, the firing state discrimination system includes an ignition coil 10 whose primary side (low-voltage side) coil 10*a* is connected at one end to an electric power source (onboard battery) 12 and is grounded at the other end through a power transistor 16 that can be switched to ON or OFF state by an ignition signal from an ECU (Electronic Control Unit) 14.

One end of the secondary side (high-voltage side) coil 10*b* of the ignition coil 10 is connected to the center electrode 24*a* of a spark plug 24 installed in a combustion chamber 22 of each cylinder (only one indicated as the corresponding part of a cylinder head 18) of a multi-cylinder internal combustion engine (only illustrated by the cylinder etc.) 20. The ground (outer) electrode 24*b* of the spark plug 24 is grounded through the cylinder head 18. Following the completion of discharge, the spark plug 24 also functions as a probe for detecting ionic-current.

The other end of the secondary coil 10*b* of the ignition coil 10 is connected to an ionic-current detector (current detection circuit) 30. The ionic-current detector 30 includes a parallel connection of an ionic-current detection capacitor 32 to be charged in the illustrated polarity by discharge current and a Zener diode 34 that regulates the charging voltage of the ionic-current detection capacitor 32, a detection resistor 36 through which the ionic-current detection capacitor 32 is grounded, and a diode 38 that prevents reverse current flow through which the Zener diode 34 is grounded.

The ECU 14 comprises a microcomputer having a CPU, a ROM, a RAM and input/output circuits, etc. It is inputted with the outputs of a group of sensors, including a crank angle sensor 40 that is installed near the crankshaft or camshaft (neither shown) of the engine 20 and outputs a signal representing the TDC (Top Dead Center) of the individual cylinders and unit crank angles (obtained by dividing the interval between the TDCs), a manifold absolute pressure sensor 42 that outputs a signal representing the absolute pressure (PBA) in the air intake pipe, and other sensors not shown in the drawing.

The ECU 14 is connected to a warning lamp 44 which is installed at a position near the vehicle operator seat (not shown) through a drive circuit (not shown). The ECU 14 informs the result of discrimination to the vehicle operator by turning the lamp 44 from OFF to ON when the spark plug 24 is discriminated to be fouled (smoldered), or misfiring or failure is discriminated to be occurred.

The operation of the illustrated arrangement will now be explained.

The flow of current from the power source 12 through the primary coil 10*a* is switched (turned ON and OFF) by the power transistor 16 in response to the ignition signal (ignition command current pulse) sent from the ECU 14.

When the ignition command pulse is made from ON to OFF, i.e., when the current flow through the primary coil 10*a* is stopped by switching of the power transistor 16 from ON to OFF, a high voltage of negative polarity is concurrently produced in the secondary coil 10*b*. Discharge current therefore flows as indicated by the alternate long and short dashed line in FIG. 1. Specifically, current flowing through the path of the spark plug 24→secondary coil 10*b*→ionic-current detection capacitor 32 (or Zener diode 34)→diode 38 produces a spark discharge across the gap of the spark plug 24 (between the center electrode 24*a* and ground electrode 24*b*) that ignites or fires the air-fuel mixture in the cylinder combustion chamber and causes combustion.

The discharge current charges the capacitor 32 to the polarity as illustrated in the figure. When charged, this capacitor 32 functions as a current detection power source with a bias voltage for detecting ionic-current and leakage current.

During the combustion of the air-fuel mixture set off by the spark discharge at the spark plug 24, the air-fuel mixture (more precisely the combustion gas produced by normal burning of the air-fuel mixture) ionizes. The ions produced migrate owing to the effect of the bias voltage of the ionic-current detection capacitor 32 and their resulting presence between the electrodes of the spark plug 24 lowers the electrical resistance between the electrodes. As a result, ionic-current flows through the path of the ionic-current detection capacitor 32→secondary coil 10*b*→spark plug 24, as indicated by the alternate long and two short dashed line in FIG. 1. The ionic-current occurring at this time causes the voltage drop across the detection resistor 36 to change. The ionic-current detector 30 outputs this voltage change, i.e., the ionic-current waveform, to a waveform converter explained later.

As mentioned above, when the center electrode 24*a* or the ground electrode 24*b* of the spark plug 24 is fouled (smoldered) by deposits of soot, carbon residues, ash from fuel and oil additives, etc., the resistance between the electrodes drops and the leakage current may flow along the same path as that of the ionic-current. This leakage current can be detected in the same manner as the ionic-current. The ionic-current detection explained later will also be applied to the leakage current detection.

The ECU 14 calculates an ignition timing based on the inputted values sent from the crank angle sensor 40, the manifold absolute pressure sensor 42 and other sensors, and produces an ignition command pulse in such a way that ignition occurs at the calculated ignition timing. It also discriminates the firing state based on an integral value (voltage) outputted by an integrator (explained later) and based on the determination whether the engine is under the fuel cutoff condition.

Figure 2:
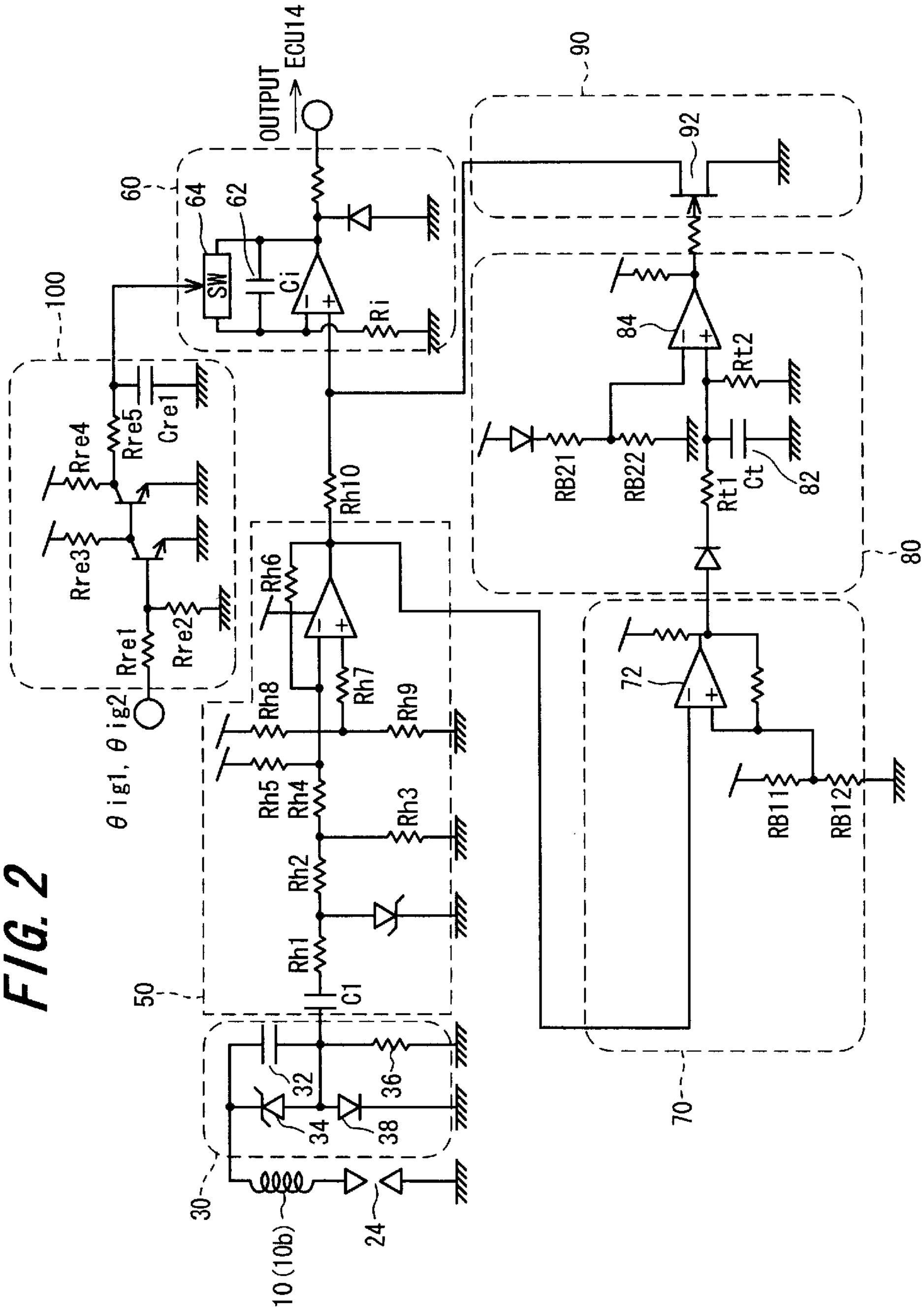
FIG. 2 is a circuit diagram schematically showing the overall configuration of the firing state discrimination system for internal combustion engines according to the embodiment.

FIG. 2 is a circuit diagram schematically showing the overall configuration of the firing state discrimination system for internal combustion engines according to the embodiment of the present invention. Part of the ignition circuit is omitted from FIG. 2 for convenience of illustration.

Before going into an explanation of FIG. 2, however, the operation of the circuit will, for ease of understanding, be generally explained with reference to FIG. 3.

Figure 3:
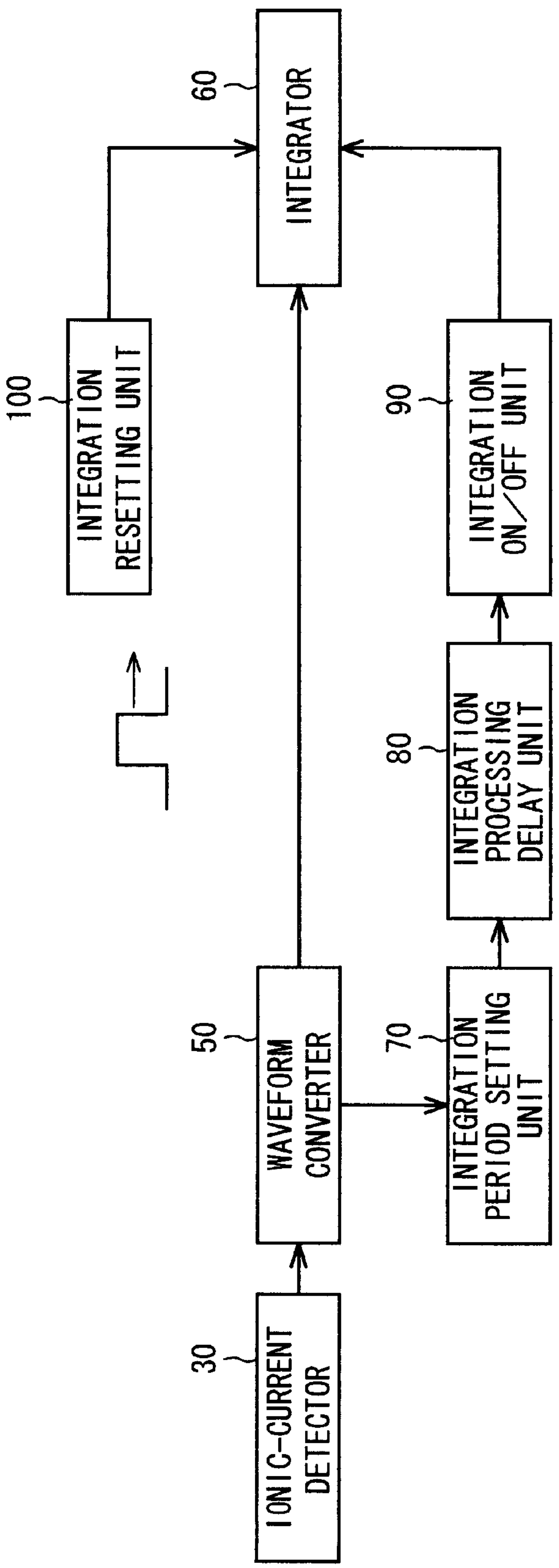
FIG. 3 is a block diagram showing the circuits illustrated in FIG. 2 in block form.

FIG. 3 is a block diagram representing the circuit of FIG. 2 in block form.

The ionic-current waveform detected in the ionic-current detector 30 is forwarded to a waveform converter 50 that subjects the waveform to polarity-reversal and voltage-reduction processing.

The ionic-current waveform subjected to polarity-reversal and voltage-reduction in the waveform converter 50 is then inputted to an integrator 60 that effects integration processing to determine the time integral of the ionic-current. As a result, there obtained an output signal proportional to the time integral.

The ionic-current waveform after polarity reversal and voltage reduction in the waveform converter 50 is also sent to an integration period setting unit 70. The integration period setting unit 70 passes the ionic-current waveform through an internal low-pass filter to attenuate frequency band components (noise) other than the ionic-current, and sets or determines the ionic-current integration period in proportion to the period of time during which ionic-current continues to occur, thereby setting the period of integration by the integrator 60.

The output of the integration period setting unit 70 is sent to an integration processing delay unit (circuit) 80 which delays (masks) the integration start time set by the integration period setting unit 70 to a time point that enables avoidance of the effect of inductive noise. The output of the integration processing delay unit 80 is sent to an integration on/off unit 90 which operates to turn the input of the ionic-current waveform to the integrator 60 ON and OFF in response to the integration period and integration start time set or determined by the integration period setting unit 70 and the integration processing delay unit 80. The integration by the integrator 60 is thus limited to a desired period of time, i.e., only to the period of time during which ionic-current continues to occur.

The integral output calculated over the integration period of time by the integrator 60 is resetted to its initial value (zero) by an integration resetting unit 100 when an ignition timing signal θig1 (in crank angle) indicative of the ignition command to the spark plug 24 is generated and when another signal θig2 (in crank angle) is generated at a time later than the ignition timing θig1 (more specifically, it is generated after the ionic-current detection has been completed).

The foregoing configuration and its operation will now be explained in detail with reference to FIG. 2.

First, as pointed out in the foregoing, the ionic-current detector 30 detects the ionic-current waveform (more precisely the voltage waveform) produced by air-fuel mixture combustion and the detected ionic-current waveform is outputted to the waveform converter 50.

Figure 4:
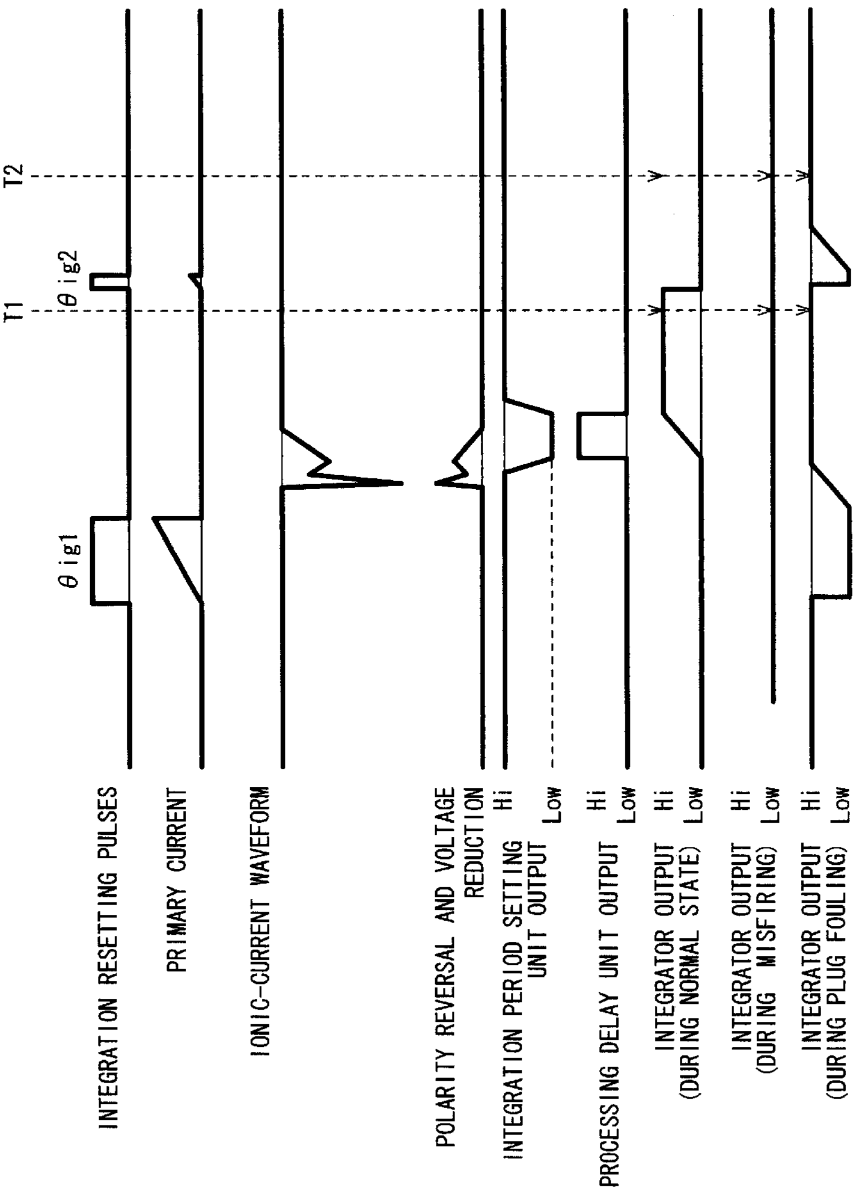
FIG. 4 is a time chart showing outputs (detected current waveforms and pulses) in the firing state discrimination system during normal firing or combustion.

FIG. 4 is a time chart showing outputs (detected current waveforms and pulses) in the firing state discrimination system of the present embodiment. The time chart of FIG. 4 is for the case of normal combustion, but includes ones for the case of misfiring and spark plug fouling.

As shown in FIG. 4, the ionic-current waveform detected by the ionic-current detector 30 (specifically the detection resistor 36), spikes instantaneously in the minus direction owing to inductive noise just after the discharge across the gap of the spark plug 24, current thereafter continues to flow in proportion to the volume or number of ions produced, and eventually returns to a given level.

The ionic-current waveform detected in the ionic-current detector 30 is forwarded to the waveform converter 50, where it is reversed in polarity and lowered in voltage and is then sent to the integrator 60. The ionic-current waveform after polarity reversal and voltage reduction in the waveform converter 50 is also sent to the integration period setting unit 70 where the ionic-current waveform is inputted to the negative (inverting) terminal of an integration period setting comparator 72. The positive (non-inverting) terminal of the comparator 72 is supplied with a reference voltage and compares the inputs. When the ionic-current waveform is higher, it outputs a low signal, while it outputs a high signal when the reference voltage is higher.

The low signal output period of the integration period setting comparator 72 is the period of time of integration performed in the integrator 70 and thus to the ionic-current detection period for detecting misfiring. Since the integration period setting unit 70 thus sets the period of time based on the ionic-current waveform (the period of ionic-current occurrence), currents that arise outside the period of ionic-current occurrence owing to various kinds of noise and other causes are not detected and are therefore prevented from having an effect on the misfiring detection. As a result, false misfiring detection owing to such currents is prevented and accurate misfiring detection is ensured.

The output pulse of the integration period setting unit 70 is sent to the integration processing delay unit 80. The integration processing delay unit 80 delays the integration start time, i.e., sets or determines the masking period at the beginning of the integration. Specifically, this is done by delaying the inverting time point of the output pulse from the unit 70 by the charging/discharging of the processing delay capacitor 82.

The so-obtained current waveform is inputted to the positive terminal of a processing delay comparator 84. The negative terminal of the comparator 84 is supplied with a reference voltage. It compares the inputs and outputs a high signal when the current waveform is higher than the reference voltage.

As can be seen from FIG. 4, the inverting time point of the output pulse finally obtained from the integration processing delay unit 80 is delayed by a certain time from the start of ionic-current occurrence. As mentioned above, the input to the integrator 60 of the ionic-current waveform is turned ON and OFF by ON/OFF operating a FET (Field Effect Transistor) 92 of the integration on/off unit 90 based on this output pulse whose inverting time point has been delayed.

The delay time varies with the capacity (indicative of time constant) of the processing delay capacitor 82 and the magnitude of the reference voltage. Therefore, by appropriately setting or determining one or both of these values, the length of the delay time can be set to one that eliminates the influence of inductive noise. Since this makes it possible reliably mask the region of the ionic-current waveform outputted from the waveform converter 50 that corresponds to the period of inductive noise occurrence, false misfiring detection caused by inductive noise can be prevented to achieve still more accurate misfiring detection.

The output of the integrator 60 is sent to the ECU 14 where the output is read at a predetermined first timing (at a predetermined crank angular position; illustrated as "T1" in FIG. 4) after the ionic-current ceases to occur.

The voltage of the integration capacitor 62 is resetted by the integration resetting unit 100 when the ignition timing signal θig1 is generated and when the other signal θig2 is generated. Specifically, the unit 100 resets by turning on a switch 64 to make the capacitor 62 to discharge in the integrator 60 each time the signal θig1 or θig2 is generated. The primary current illustrated in FIG. 4 indicates the current flowing through the primary coil 10*a* of the ignition coil 10.

The ECU 14 reads the output of the integrator 60 at a predetermined second timing (at a predetermined crank angular position; illustrated as "T2" in FIG. 4) which is later than the generation of the first signal θig1. Thus, based on the values read at the predetermined first and second timings T1, T2, the ECU 14 discriminates the firing state of the engine 20. The firing state includes normal, misfiring, spark plug fouling (smoldering) and a system failure.

Based on the above, the operation of the firing state discrimination system for internal combustion engines according to the embodiment will now be explained with reference to the flow chart of FIG. 5. The program of the flow chart is executed at a predetermined crank angular position.

The program begins in S10 in which it is determined whether it is the predetermined first timing T1 and when the result is negative, the program is immediately terminated. When the result is affirmative, the program proceeds to S12 in which the output (integrated value) at that timing is read in, i.e., the ionic-current at that timing is detected.

The program then proceeds to S14 in which it is determined whether the output (integrated value) is Hi. Here, "Hi" indicates that the output read in at T1 is higher than a predetermined first threshold value and indicates that the flow of ionic-current exceeds a predetermined reference value and hence, the firing state of the engine 20 is normal.

When the result is affirmative, the program proceeds to S16 in which it is determined whether it is the predetermined second timing T2. When the result is negative, the program loops back until the result becomes affirmative. When it is, the program proceeds to S18 in which the output at that timing is again read in (detected). The program then proceeds to S20 in which it is determined whether the output (integrated value) is Hi. Similarly, "Hi" indicates that the output read in at T2 is higher than a predetermined second threshold value. The predetermined second threshold value may be the same as the predetermined first threshold value or may be different therefrom. Since the output has been resetted by the second signal θig2 as illustrated in FIG. 4, the fact that the output at T2 is Hi indicates that current other than the ionic-current, i.e., leakage current flows and the flow thereof exceeds a prescribed reference value.

When the result is negative, the program proceeds to S22 in which it is determined whether the fuel cutoff is in progress in the engine 20. The fuel cutoff is determined under a fuel metering control routine where the supply of fuel is determined to be cut off and the bit of a flag is set to 1 if the throttle valve is fully closed or almost closed and if the engine speed NE is equal to or greater than a predetermined speed. The determination of this step is done by checking the bit of the flag.

As mentioned above, under the fuel cutoff, the firing state will be a misfiring state and no ionic-current will flow. Accordingly, when the fuel cutoff is in progress, the result in S14 must be negative. For that reason, when the result in S22 is affirmative, the program proceeds to S24 in which it is discriminated that the fuel cutoff is failed, in other words, the supply of fuel is not completely shut off due to a failure (presumably a failure occurred in the fuel supply system). The program next proceeds to S26 in which a command to turn the warning lamp 44 ON is generated to alert the vehicle operator, and the program is terminated.

On the other hand, when the result in S22 is negative, the program proceeds to S28 in which it is discriminated that the combustion has occurred and the firing state of the engine 20 is normal, and the program is then terminated. When the result in S20 is affirmative indicating that leakage current flows, the program proceeds to S30 in which it is discriminated that the spark plug is fouled (smoldered) or a failure has occurred in the ignition system or in the fuel supply system. The program then proceeds to S26 to inform the fact to the vehicle operator.

When the result in S14 is negative, the program proceeds to S32 and upon confirmation of the arrival of the timing T2, the program proceeds to S34 to read in (detect) the output at that timing and to S36 in which it is determined whether the output is Hi. When the result is negative, the program proceeds to S38 in which it is determined whether the fuel cutoff is in progress.

When the result in S38 is negative, the program proceeds to S40 in which it is discriminated that misfiring has occurred or a failure has occurred in the ignition system or in the fuel supply system, and proceeds to S26 to inform the fact to the vehicle operator. On the other hand, when the result in S38 is affirmative, the program proceeds to S42 in which it is discriminated the combustion has occurred and the firing state of the engine 20 is normal On the contrary, if the result in S36 is affirmative, since the result in S14 has been negative and hence, the result in S36 should normally be negative. Accordingly, the program proceeds to S44 in which it is discriminated that a failure has occurred in the ignition system or in the fuel supply system, and then proceeds to S26 to inform the fact to the vehicle operator.

As mentioned in the foregoing, in this system, the ionic-current is detected at the predetermined first timing T1 and the leakage current is detected at the predetermined second timing T2 (which is later than or succeeding to T1) and the firing state of the engine 20 is discriminated based on the detected ionic-current and the leakage current. With this, it becomes possible to accurately discriminate whether the firing state is normal, or misfiring has occurred, or the spark plug 24 is fouled (smoldered), or a failure has occurred in the ignition system or in the fuel supply system.

Further, since the ionic-current and the leakage current can be detected by the same hardware, the system configuration is simple.

Figure 5:
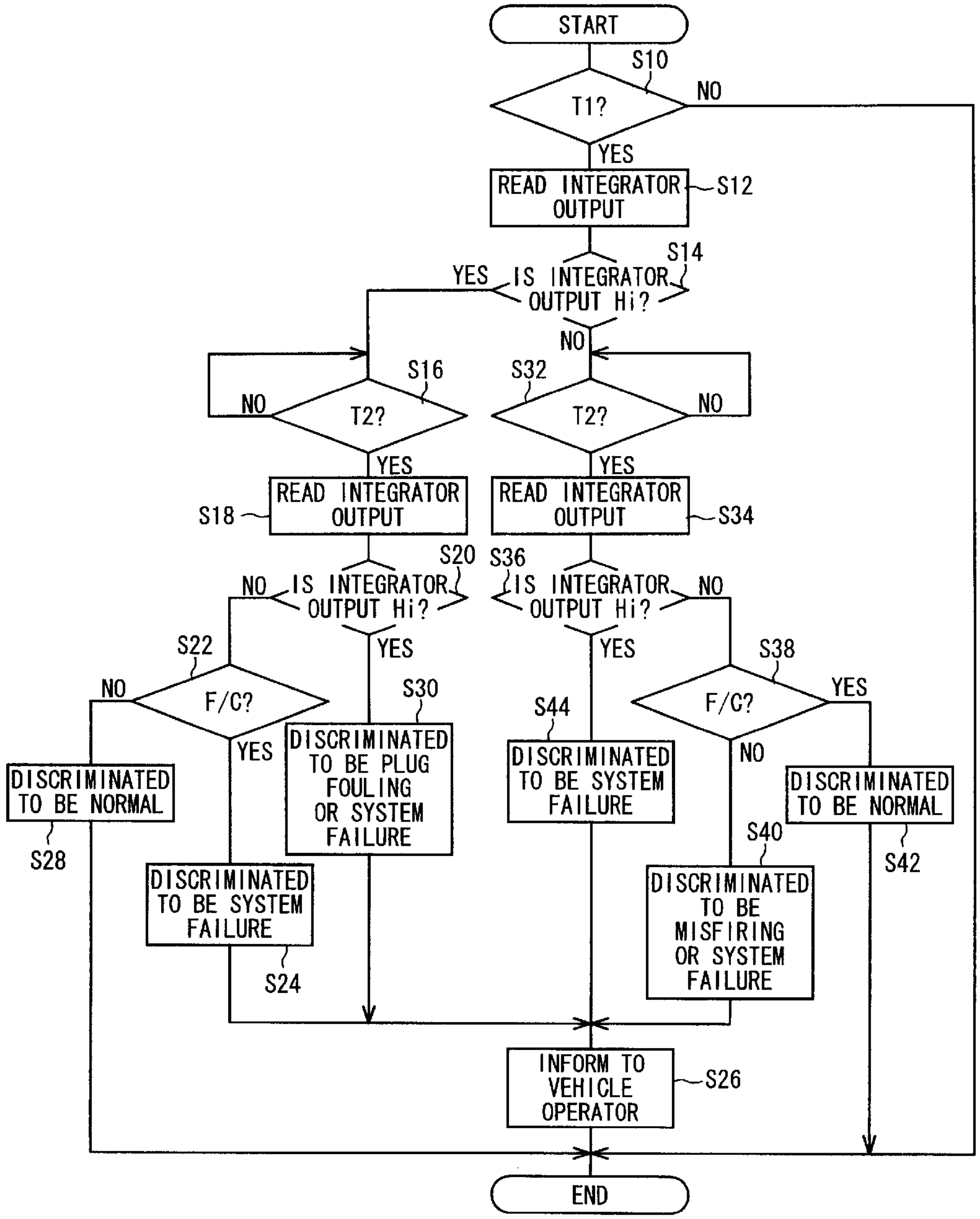
FIG. 5 is a flow chart showing the operation of the firing state discrimination system for internal combustion engines illustrated in FIG. 1.
Figure 7:
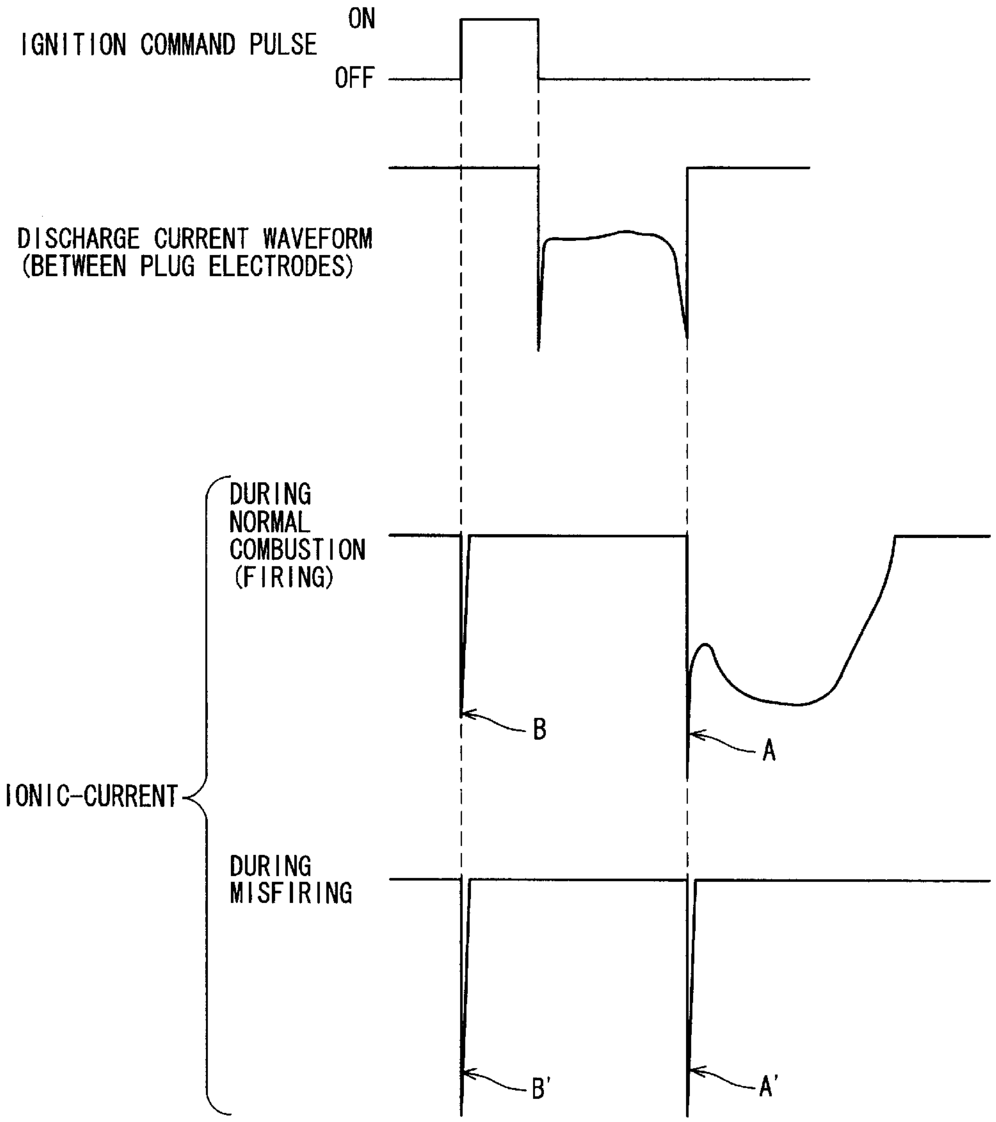
FIG. 7 is a time chart showing the ionic-current waveforms during misfiring and normal combustion of the internal combustion engine.

Further, as will be understood from the algorithm illustrated in the flow chart of FIG. 5, since the firing state is discriminated from the combination of the output indicative of the ionic-current or the leakage current (i.e., "Hi or not (Low)), it becomes possible to discriminate the firing state in a precise and simplified manner.

FIG. 6 is a table showing the combination of the detected ionic-current and the leakage current and result of discrimination obtained from the combination.

Further, since the firing state is discriminated to be one from among normal, spark plug fouling, misfiring and system failure, it becomes possible to discriminate the firing state more specifically.

Further, since the firing state is discriminated after having determined whether the fuel cutoff is in progress in the engine 20, it becomes possible to prevent from the misfiring state during fuel cutoff from ordinary misfiring.

Furthermore, since the firing state is informed to the vehicle operator. Specifically, when the firing state falls in one of spark plug fouling, misfiring and system failure, since the warning lamp 44 is turned ON to alert it to the vehicle operator, it becomes possible to avoid further degradation of emission, etc.

Having been described in the foregoing, the embodiment is configured to have a system for discriminating firing state for an internal combustion engine (20) having a spark plug (24), installed in a combustion chamber (22) of a cylinder of the engine and connected to an ignition coil (24), which produces spark discharge when supplied with discharge current from the ignition coil to ignite air-fuel mixture in the combustion chamber; comprising: ionic-current detecting means (14, 30, S10–S12) for detecting ionic-current that flows during combustion of the air-fuel mixture, at a predetermined first timing (T1); leakage current detecting means (14, 30, S16–S18, S32–S34) for detecting leakage current that flows across electrodes of the spark plug, at a predetermined second timing (T2) which is later than the predetermined first timing (T1); and firing state discriminating means (14, S14, S20, S24, S28–S30, S36, S40–S44) for discriminating firing state of the engine based on outputs of the ionic-current detecting means and the leakage current detecting means.

In the system, the firing state discriminating means discriminates the firing state of the engine based a combination of the outputs of the ionic-current detecting means and leakage current detecting means.

In the system, the firing state discriminating means discriminates the firing state to least one from among normal, misfiring, spark plug fouling, and failure in ignition system or in fuel supply system.

The system further includes fuel cutoff detecting means (14, S22, S38) for detecting whether fuel cutoff is in progress in the engine; and the firing state discriminating means discriminates the firing state based on a combination of the outputs of the ionic-current detecting means and the leaking current detecting means and an output of the fuel cutoff detecting means.

The system further includes: informing means (14, 44 S26) for informing the discriminated firing state to a vehicle operator.

In the system, the ionic-current detecting means detects the ionic-current as a value integrated for a period of time, and the leakage current detecting means detects the leakage current as a value integrated for a period of time.

The entire disclosure of Japanese Patent Application No. 2001-202591 filed on Jul. 3, 2001, including specification, claims, drawings and summary, is incorporated herein in reference in its entirety.

While the invention has thus been shown and described with reference to specific embodiments, it should be noted that the invention is in no way limited to the details of the described arrangements but changes and modifications may be made without departing from the scope of the appended claims.

What is claimed is:

1. A system for discriminating firing state for an internal combustion engine having a spark plug, installed in a combustion chamber of a cylinder of the engine and connected to an ignition coil, which produces spark discharge when supplied with discharge current from the ignition coil to ignite air-fuel mixture in the combustion chamber; comprising:

ionic-current detecting means for detecting ionic-current that flows during combustion of the air-fuel mixture, at a predetermined first timing;

leakage current detecting means for detecting leakage current that flows across electrodes of the spark plug, at a predetermined second timing which is later than the predetermined first timing; and firing state discriminating means for discriminating firing state of the engine based on outputs of the ionic-current detecting means and the leakage current detecting means.

2. A system according to claim 1, wherein the firing state discriminating means discriminates the firing state of the engine based a combination of the outputs of the ionic-current detecting means and leakage current detecting means.

3. A system according to claim 2, wherein the firing state discriminating means discriminates the firing state to least one from among normal, misfiring, spark plug fouling, and failure in ignition system or in fuel supply system.

4. A system according to claim 2, further including:

fuel cutoff detecting means for detecting whether fuel cutoff is in progress in the engine;

and the firing state discriminating means discriminates the firing state based on a combination of the outputs of the ionic-current detecting means and the leaking current detecting means and an output of the fuel cutoff detecting means.

5. A system according to claim 1, further including:

informing means for informing the discriminated firing state to a vehicle operator.

6. A system according to claim 1, wherein the ionic-current detecting means detects the ionic-current as a value integrated for a period of time.

7. A system according to claim 1, wherein the leakage current detecting means detects the leakage current as a value integrated for a period of time.

8. A method of discriminating firing state for an internal combustion engine having a spark plug, installed in a combustion chamber of a cylinder of the engine and connected to an ignition coil, which produces spark discharge when supplied with discharge current from the ignition coil to ignite air-fuel mixture in the combustion chamber; comprising the steps of:

detecting ionic-current that flows during combustion of the air-fuel mixture, at a predetermined first timing;

detecting leakage current that flows across electrodes of the spark plug, at a predetermined second timing which is later than the predetermined first timing; and discriminating firing state of the engine based on the detected ionic-current and leakage current.

9. A method according to claim 8, wherein the step of firing state discriminating discriminates the firing state of the engine based a combination of the detected ionic-current and leakage current.

10. A method according to claim 9, wherein the step of firing state discriminating discriminates the firing state to least one from among normal, misfiring, spark plug fouling, and failure in ignition system or in fuel supply system.

11. A method according to claim 9, further including the step of:

detecting whether fuel cutoff is in progress in the engine;

and the step of firing state discriminating discriminates the firing state based on a combination of the detected ionic-current and leaking current and a result of detection whether the fuel cutoff is in progress.

12. A method according to claim 8, further including the step of:

informing the discriminated firing state to a vehicle operator.

13. A method according to claim 8, wherein the step of ionic-current detecting detects the ionic-current as a value integrated for a period of time.

14. A method according to claim 8, wherein the step of leakage current detecting detects the leakage current as a value integrated for a period of time.

15. A computer program embodied on a computer-readable medium for discriminating firing state for an internal combustion engine having a spark plug, installed in a combustion chamber of a cylinder of the engine and connected to an ignition coil, which produces spark discharge when supplied with discharge current from the ignition coil to ignite air-fuel mixture in the combustion chamber; comprising the steps of:

detecting ionic-current that flows during combustion of the air-fuel mixture, at a predetermined first timing;

detecting leakage current that flows across electrodes of the spark plug, at a predetermined second timing which is later than the predetermined first timing; and discriminating firing state of the engine based on the detected ionic-current and leakage current.

* * * * *